(No Model.)
J. POWELL.
LUBRICATOR.
No. 408,927. Patented Aug. 13, 1889.
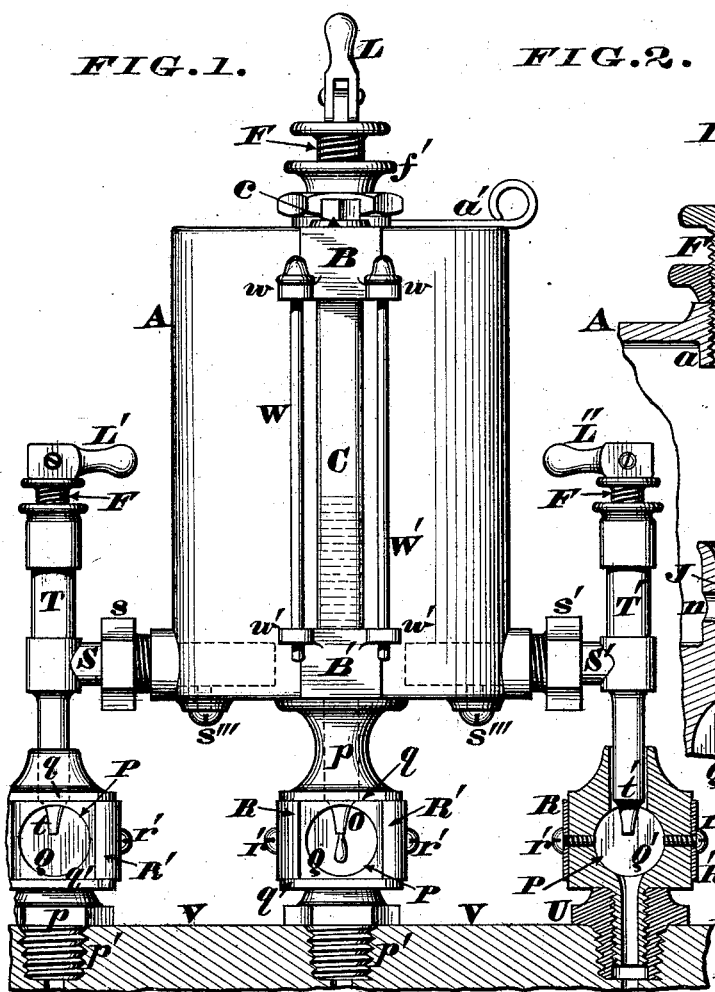
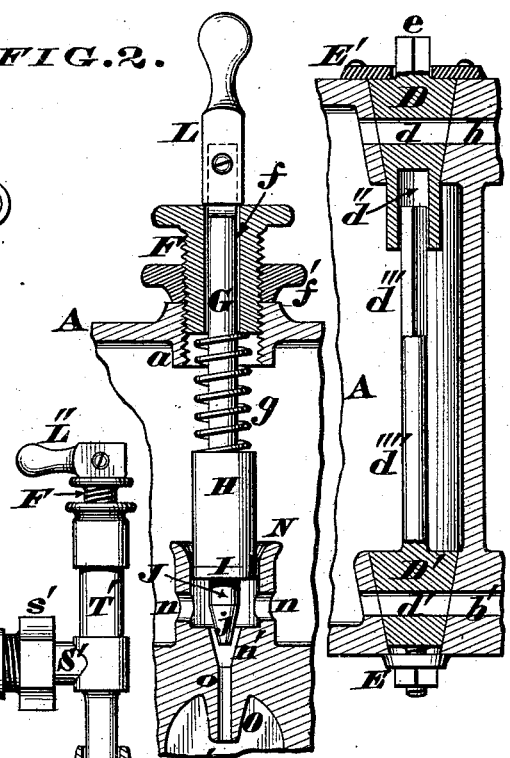
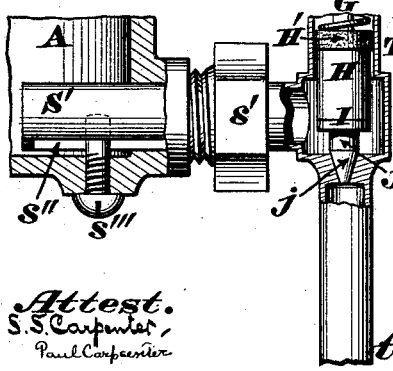
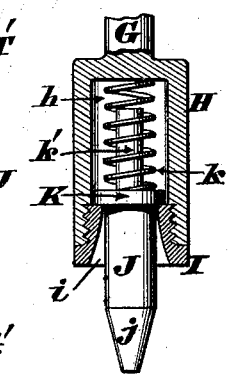
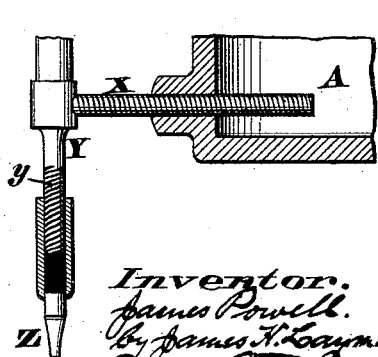
Attest.
S. S. Carpenter,
Paul Carpenter
Inventor.
James Powell.
by James N. Layman
Atty.

UNITED STATES PATENT OFFICE.

JAMES POWELL, OF CINCINNATI, OHIO.

LUBRICATOR.

SPECIFICATION forming part of Letters Patent No. 408,927, dated August 13, 1889.

Application filed March 23, 1889. Serial No. 304,527. (No model.)

*To all whom it may concern:*

Be it known that I, JAMES POWELL, a citizen of the United States, residing at Cincinnati, in the county of Hamilton and State of Ohio, have invented certain new and useful Improvements in Lubricators; and I do declare the following to be a full, clear, and exact description of the invention, reference being had to the accompanying drawings, which form a part of this specification.

This invention relates to those gravity-feed lubricators which are employed for automatically oiling journals and other similar bearings; and the first part of my improvements comprises a novel construction of loosely-coupled valve for regulating the discharge from the fount or reservoir, the details of said coupling being hereinafter more fully described.

The second part of my improvements consists in providing the fount with two or more laterally-adjustable nozzles, which can be shifted either toward or away from said fount as occasion requires, so as to accommodate themselves to a set of oil-holes in the cap of a journal-box or other bearing, as hereinafter more fully described.

The third part of my improvements consists in rendering the sight-chambers of these nozzles vertically adjustable, for the purpose of being more readily applied to certain forms of journal-boxes or other bearings, as hereinafter more fully described.

The fourth part of my improvements comprises a novel cut-off for simultaneously closing the channels leading from the oil-fount to the upper and lower sockets that contain the ends of the glass gage or index usually applied to gravity-feed lubricators, as hereinafter more fully described.

The fifth part of my improvements comprises a novel combination of devices for securing detachable glasses to the sight-chamber of the lubricator, as hereinafter more fully described.

In the annexed drawings, Figure 1 is a side elevation of a lubricator provided with three discharge-nozzles, the central nozzle being shown in operation, while the two side nozzles are inoperative, the sight-chamber of one of said nozzles being sectioned. Fig. 2 is an enlarged axial section through the valve-operating devices, the valve proper being raised from its seat. Fig. 3 is an enlarged vertical section of the duplex cut-off for the glass gage or index of the lubricator. Fig. 4 is an enlarged horizontal section through the sight-chamber and its accessories. Fig. 5 is a sectional elevation of a portion of one of the laterally-adjustable nozzles. Fig. 6 is an enlarged axial section of the valve-carrier and its adjuncts. Fig. 7 is a modification of the invention.

The fount or reservoir A, which is usually a hollow metallic cylinder, has a pair of integral sockets B B', to admit the ends of the glass gage or index C, which tube is retained within said sockets by a customary screw-cap $c$. Furthermore, these sockets have channels $b\ b'$, communicating with the interior of the fount, as seen in Fig. 3, and said channels are controlled by conical turning-plugs D D', provided with transverse parts $d\ d'$, and the plug D having in its lower end a square mortise $d''$ to receive a square tenon $d'''$ at the upper end of a stem $d''''$. This stem $d''''$ projects rigidly from the lower plug D', which latter is retained within its conical seat by a washer-and-nut connection E.

E' is a plate that retains the plug D within its seat, said plate being pierced centrally to permit free turning of the square $e$ at the upper end of said plug. Fount A has on its upper head an interiorly-threaded neck $a$, to admit a long tubular nut F, having a smooth bore $f$, that permits free play of the stem G, around which latter is coiled a pushing-spring $g$, whose upper end bears against the nut F, as seen in Fig. 2.

$f'$ is a jam-nut that holds the nut F to any specific adjustment, for the purpose of imparting more or less tension to the spring $g$, and on this account said device F will hereinafter be alluded to as the "tension-nut." The lower end of spring $g$ bears against the cylindrical valve-carrier H, having a chamber $h$, and at bottom a screw-threaded cap I, provided with a bore $i$, so enlarged as to permit a slight lateral play of a short plug J, terminating with a conical portion $j$, that constitutes the valve proper of the lubricator. Plug J has at its upper end a fixed collar K, that normally rests upon the cap I, said collar being held in this position by a spring $k$, coiled around the shank $k'$ of the plug. (See Fig. 6.)

L is a forked lever or handle pivoted to the upper end of stem G, which lever is capable of being swung either up or down, as occasion requires. Valve-carrier H is confined to a vertical path by a short open-mouthed cup N at the bottom of the fount, and usually integral therewith, said cup being provided with one or more inlets $n$ and a valve-seat $n'$, which seat is located at the upper end of a channel $o$, traversing the discharge-nozzle O. This nozzle projects down a sufficient distance into the sight-chamber P, which chamber is formed in the base or standard $p$ of the lubricator, and said base is in many cases integral with the fount.

$p'$ is the screw-connection wherewith the base is attached to the cap of a journal-box or other bearing. The sides of base $p$ have horizontal flanges $q\ q'$, between which are inserted glasses Q Q', the latter being held in place by clips R R', whose ends $r$ are so bent as to grasp the vertical edges of said glasses, as more clearly seen in Fig. 4.

$r'$ are screws wherewith the clips are secured to the ends of the base $p$, and, if desired, these screws may have milled heads, so as to be readily turned by hand.

Projecting horizontally from the fount A, and near the bottom of the same, are laterally-adjustable side pipes S S', traversing stuffing-boxes $s\ s'$ and communicating with chambers T T', from which depend discharge-nozzles $t\ t'$, said chambers being provided with valve-operating devices precisely similar to those seen in Figs. 2 and 6. It is preferred, however, to apply a packing-ring to the upper end of valve-carrier H, as seen at H' in Fig. 5, which packing prevents oil ascending within the chamber T'. Each side pipe is slotted longitudinally at $s''$ to admit the point of a screw $s'''$, which screw prevents said pipe turning. Furthermore, this screw serves as a stop to prevent the pipe being pulled out by coming in contact with the inner or closed end of said slot.

U is a nipple, into which the shank $p'$ of the base $p$ may be screwed, said nipple being engaged with the cap V of a journal-box or other similar bearing. This cap has three channels $v\ v'\ v''$ for the passage of oil down to the journal.

$w\ w$ and $w'\ w'$ are perforated lugs projecting from the sockets B B' and traversed by readily-removable rods W W', which serve as fenders or guards to prevent the tube C being injured. The swinging scutcheon $a'$ (seen only in Fig. 1) may be applied to the reservoir in the manner described in Letters Patent No. 326,519, granted to me September 15, 1885.

When this lubricator is to be fitted to a long journal-box cap or other bearing having three oil-holes, as $v\ v'\ v''$, the axial nozzle is inserted within the central hole $v'$, and the side pipes S S' are then adjusted laterally, so as to allow their respective nozzles $t\ t'$ to communicate with the other holes $v\ v''$, as seen in Fig. 1. The handle L is then swung up to a vertical position and the tension-nut F is adjusted until a sufficient opening is left between the valve $j$ and seat $n'$ to afford the desired discharge of oil, after which act the jam-nut $f'$ is tightened to preserve this adjustment and prevent it being disarranged by the vibrations of the machinery or otherwise. The various valves having been thus adjusted, the oil is delivered from the nozzles O $t\ t'$ and passes down through the channels $v\ v'\ v''$ to the journal, the feed or rate of delivery being plainly seen at the windows Q Q'. Furthermore, as this feed can take place only when the handles L are elevated, it is evident that they act as signals to indicate the proper working of the lubricator. The feed can be stopped from either or all the nozzles by simply swinging the handles down, as seen at L' and L'' in Fig. 1, thereby closing the valves. (See Fig. 5.) While thus swinging down the handle the spring $g$ has an opportunity to exert its full force, which act would jam the valve $j$ violently against its seat, in case said valve were rigidly attached to the stem G; but as it is yieldingly coupled thereto by the spring $k$ the valve $j$ accordingly closes without any jar or concussion, and on this account neither the valve nor seat can be injured, no matter how suddenly the lever may be thrown down. Furthermore, as the plug J has sufficient lateral play within the bore $i$ of cap I, the valve $j$ can automatically adjust itself to the seat while closing, although the latter may not be accurately in line with the operating-stem G. When the valves are closed, the turned-down or horizontal handles indicate that the lubricator is inoperative for the time being. If either of the glasses Q or Q' should break, one of the screws $r'$ can be sufficiently slackened to permit such a shifting of the clip R or R' as will enable the broken glass to be taken out. A new one can then be inserted in a few moments and secured in place by again tightening up said screw, which operations can be performed without removing the lubricator or stopping the engine or machinery. Neither is it necessary to stop the flow of oil while these repairs are being made. If the index-tube C should break, the plugs D D' can be simultaneously turned, so as to close the passages $b\ b'$, leading to said tube, and then the cap $c$ can be unscrewed to facilitate the removal of the old tube and the insertion of a new one. After the new tube has been applied and the cap screwed to the socket B the plugs D D' are turned to open communication between said tube and the oil-reservoir, which changes can be effected without disturbing any of the other attachments of the lubricator or stopping the flow of oil through the sight chambers or chamber. In the modification of my invention seen in Fig. 7 the side pipe X is screw-threaded externally, so as to be adjusted out or in with reference to the fount A, and the pendent tube Y is screw-threaded at its lower end, as at $y$. Z is a nozzle engaged with this screw-threaded tube. By this arrangement the nozzle can be adjusted either up or down, as occasion requires, thereby dispensing with the nipple U. (Seen in Fig. 1.)

I claim as my invention—

1. The combination, in a lubricator, of a self-closing valve-carrier, a valve proper flexibly coupled to said carrier, and a reservoir having a seat for said valve to close against, which seat has a discharge-passage, substantially as herein described.

2. The combination, in a lubricator, of the self-closing chambered valve-carrier H $h$, cap I $i$, attached thereto, plug J, valve $j$, collar K, spring $k$, and shank $k'$, as herein described.

3. The combination, in a lubricator, of a reservoir having a screw-threaded neck $a$, seat $n'$, passage $o$, tension-nut F $f$, jam-nut $f'$, stem G, spring $g$, valve-carrier H, and lever L, said carrier having a valve flexibly coupled to it, for the purpose described.

4. A lubricator provided with one or more laterally-adjustable side pipes having independent discharge-nozzles, for the purpose described.

5. A lubricator provided with a central discharge-nozzle, and one or more laterally-adjustable side pipes having independent discharge-nozzles, for the purpose described.

6. A lubricator provided with a central discharge-nozzle, and one or more laterally-adjustable side pipes having independent discharge-nozzles housed within vertically-adjustable sight-chambers, for the purpose described.

7. The combination, in a lubricator, of laterally-adjustable side pipe S', valve-chamber T', discharge-nozzle $t'$, sight-chamber P, and screw-threaded nipple U, for the purpose described.

8. The combination, in a lubricator, of sight-chamber P, having flanges $q$ $q'$, glasses Q Q', clips R $r$ R' $r$, and screws $r'$, for the purpose described.

9. A lubricator provided with channels leading to the gage-tube sockets, and a pair of simultaneously-acting turning-plugs for closing said channels, substantially as herein described.

10. The combination, in a lubricator, of a reservoir having socket-channels $b$ $b'$, turning-plugs D D', mortise $d''$, tenon $d'''$, and stem $d''''$, which stem projects from the lower plug D', as herein described.

In testimony whereof I affix my signature in presence of two witnesses.

JAMES POWELL.

Witnesses:
JAMES H. LAYMAN,
SAML. S. CARPENTER.